(12) United States Patent
Andreev et al.

(10) Patent No.: US 7,870,120 B2
(45) Date of Patent: Jan. 11, 2011

(54) METHOD AND SYSTEM FOR PROCESSING A DATABASE QUERY BY A PROXY SERVER

(75) Inventors: Dmitrii Andreev, Port Chesterd, NY (US); Jagadish Dasari, Austin, TX (US); Luu Q. Nguyen, Culver City, CA (US); Gregory Vilshansky, Chappaqua, NY (US)

(73) Assignee: International Business Machines Corporation, Armonk, NY (US)

( * ) Notice: Subject to any disclaimer, the term of this patent is extended or adjusted under 35 U.S.C. 154(b) by 1836 days.

(21) Appl. No.: 10/855,677

(22) Filed: May 27, 2004

(65) Prior Publication Data

US 2005/0278276 A1   Dec. 15, 2005

(51) Int. Cl.
*G06F 7/00* (2006.01)
*G06F 17/30* (2006.01)

(52) U.S. Cl. ............... 707/713; 707/716; 707/765; 707/769; 707/770

(58) Field of Classification Search .......... 707/3
See application file for complete search history.

(56) References Cited

U.S. PATENT DOCUMENTS

| | | | | |
|---|---|---|---|---|
| 5,958,016 | A | | 9/1999 | Change et al. |
| 6,006,224 | A | * | 12/1999 | McComb et al. .......... 707/5 |
| 6,226,635 | B1 | * | 5/2001 | Katariya .............. 707/4 |
| 7,035,845 | B2 | | 4/2006 | Yao et al. ............. 707/3 |
| 7,058,634 | B2 | * | 6/2006 | Potts et al. ........... 707/10 |
| 7,103,589 | B1 | * | 9/2006 | Kepler et al. ......... 707/3 |
| 7,162,467 | B2 | * | 1/2007 | Eshleman et al. ....... 707/3 |
| 2002/0010758 | A1 | | 1/2002 | Chan |
| 2003/0126183 | A1 | | 7/2003 | Wu et al. |
| 2005/0203887 | A1 | * | 9/2005 | Joshi et al. ........... 707/3 |

FOREIGN PATENT DOCUMENTS

EP   1104142 A1   5/2001

OTHER PUBLICATIONS

John Russell, Yes, But Does It Scale, Oct. 21-24, 2001, Copyright 2001 ACM 1-58113-295-6/1/0010, pp. 12-21.
Klaus Julisch, Clustering Intrusion Detection Alarms to Support Root Cause Analysis, ACM Transactions on Information and System Security, vol. 6, No. 4, Nov. 2003, pp. 443-471.

* cited by examiner

*Primary Examiner*—Tim T. Vo
*Assistant Examiner*—Jay A Morrison
(74) *Attorney, Agent, or Firm*—Schmeiser, Olsen & Watts; William E. Schiesser (57) ABSTRACT

A method, system, and computer program product for processing a database query by a proxy server that is adapted to communicate with at least one database server. The database servers are respectively coupled to corresponding databases having tables that include a data isolation field pertaining to a group having subgroups. The data isolation field identifies a subgroup. The proxy server receives the query from an application server. The query is a request for data stored one of the databases. The proxy server determines whether the query has a data isolation problem. If the query does not have a data isolation problem, then the proxy server obtains a response to the query from one of the database servers and forwards the response to the application server. Otherwise, the proxy server records that a query error has occurred and returns an error code and/or empty dataset to the application server.

45 Claims, 5 Drawing Sheets

METHOD AND SYSTEM FOR PROCESSING A DATABASE QUERY BY A PROXY SERVER

BACKGROUND OF THE INVENTION

1. Technical Field

The present invention relates to a method, system, and computer program product for processing a database query by a proxy server that is adapted to communicate with at least one database server.

2. Related Art

Some software applications which are becoming hosted e-utilities were initially designed to work in a dedicated single-customer environment. During the porting to shared multi-customer environment those applications have inherited design features which compromise security and/or efficiency and/or functionality of e-utilities built upon those applications. Accordingly, there is a need for processing a query for applications in a shared multi-customer environment in a manner that mitigates or eliminates design features which compromise security and/or efficiency and/or functionality of e-utilities built upon those applications.

SUMMARY OF THE INVENTION

The present invention provides a method for processing a database query by a proxy server, said method comprising:

receiving the query from an application server;

determining whether any database table in the query comprises a data isolation field pertaining to a group, wherein a value of the data isolation field identifies a subgroup of the group;

if said determining determines that no table in the query comprises the data isolation field then performing database server steps of forwarding the query to a database server which is coupled to a database comprising tables having the data isolation field, receiving a response to the query from the database server, and forwarding the response to the application server, but if said determining determines that at least one table in the query comprises the data isolation field then ascertaining whether the query includes a Where-type clause comprising the data isolation field;

if said ascertaining ascertains that the query includes a Where-Type clause comprising the data isolation field then performing the database server steps, but if said ascertaining ascertains that the query does not include a Where-Type clause comprising the data isolation field then performing error recording and notification steps of recording that a query error has occurred and returning an error code and/or empty dataset to the application server, wherein the receiving step, the determining step, the ascertaining step, the database server steps, and the error recording and notification steps are performed by the proxy server.

The present invention provides a method for processing a database query by a proxy server, said method comprising:

receiving the query from an application server, wherein the query is a request for data stored within N databases, wherein N is at least 2, wherein the N databases comprise database tables that include a data isolation field pertaining to a group comprising a plurality of subgroups, wherein a value of the data isolation field identifies a subgroup of the group, wherein at least one database of the N databases includes a common database of tables comprising data that is not specific to any subgroup of the group, wherein the proxy server is adapted to communicate with N database servers, and wherein the N database servers are respectively coupled to the N databases;

making a determination of whether any database table in the query comprises a data isolation field pertaining to a group, wherein a value of the data isolation field identifies a subgroup of the group;

if said making a determination makes a determination that no table in the query comprises the data isolation field then performing database common steps of forwarding the query to a common database server of the N database servers which can access the common database, receiving a response to the query from the common database server, and forwarding the response from the common database server to the application server, but if said making a determination makes a determination that at least one table in the query comprises the data isolation field then determining whether the query includes a Where-type clause comprising the data isolation field;

if said determining determines that the query does not include a Where-type clause comprising the data isolation field then performing error steps comprising returning an error code and/or empty dataset to the application server, but if said determining determines that the query includes a Where-type clause comprising the data isolation field then ascertaining whether the value of the data isolation field in the query is valid for a specific server of the N database servers;

if said ascertaining ascertains that the value of the data isolation field in the query is valid for a specific database server of the N database servers then performing database server steps of forwarding the query to the specific database server, receiving a response to the query from the specific database server, and forwarding the response from the specific database server to the application server, but if said ascertaining ascertains that the value of the data isolation field in the query is not valid for a specific database server of the N database servers then performing said error steps, wherein the receiving step, the determining step, the ascertaining step, the database common steps, the database server steps, and the error steps are performed by the proxy server.

The present invention provides a system for processing a database query, said system comprising a proxy server and a database server, said database server coupled to a database having database tables comprising a data isolation field pertaining to a group such that a value of the data isolation field identifies a subgroup of the group, said proxy server adapted to receive the query from an application server;

said proxy server adapted to determine whether any database table in the query comprises the data isolation field;

if the proxy server has determined that no table in the query comprises the data isolation field then the proxy server is adapted to perform database server steps of forwarding the query to the database server which is coupled to a database that comprises the database table, receiving a response to the query from the database server, and forwarding the response to the application server, but if the proxy server has determined that at least one table in the query comprises the data isolation field then the proxy server is adapted to ascertain whether the query includes a Where-type clause comprising the data isolation field;

if the proxy server has ascertained that the query includes a Where-Type clause comprising the data isolation field then the proxy server is adapted to perform the database server steps, but if the proxy server has ascertained that the query does not include a Where-Type clause comprising the data isolation field then the proxy server is adapted to perform error recording and notification steps of recording that a query error has occurred and returning an error code and/or empty dataset to the application server.

The present invention provides a system for processing a database query, said system comprising a proxy server and N database servers respectively coupled to the N databases, N being at least 2;

said proxy server adapted to communicate with the N database servers;

said proxy server adapted to receive the query from an application server, wherein the query is a request for data stored within the N databases, wherein the N databases comprise database tables that include a data isolation field pertaining to a group comprising a plurality of subgroups, wherein a value of the data isolation field identifies a subgroup of the group, and wherein at least one database of the N databases includes a common database of tables comprising data that is not specific to any subgroup of the group, said proxy server adapted to make a determination of whether any database table in the query comprises a data isolation field pertaining to a group, wherein a value of the data isolation field identifies a subgroup of the group;

if said proxy server has made a determination that no table in the query comprises the data isolation field then the proxy server is adapted to perform database common steps of forwarding the query to a common database server of the N database servers which can access the common database, receiving a response to the query from the common database server, and forwarding the response from the common database server to the application server, but if said proxy server has made a determination that at least one table in the query comprises the data isolation field then the proxy server is adapted to determine whether the query includes a Where-type clause comprising the data isolation field;

if said proxy server has determined that the query does not include a Where-type clause comprising the data isolation field then the proxy server is adapted to perform error steps comprising returning an error code and/or empty dataset to the application server, but if said proxy server has determined that the query includes a Where-type clause comprising the data isolation field then the proxy server is adapted to ascertain whether the value of the data isolation field in the query is valid for a specific database server of the N database servers;

if the proxy server has ascertained that the value of the data isolation field in the query is valid for a specific database server of the N database servers then the proxy server is adapted to perform steps of forwarding the query to the specific database server, receiving a response to the query from the specific database server, and forwarding the response from the specific database server to the application server, but if the proxy server has ascertained that the value of the data isolation field in the query is not valid for a specific database server of the N database servers then the proxy server is adapted to perform said error steps.

The present invention provides a computer program product, comprising a computer usable medium having a computer readable program code embodied therein, said computer readable program code comprising a proxy server adapted to implement a method for processing a database query by the proxy server, said method comprising:

receiving the query from an application server;

determining whether any database table in the query comprises a data isolation field pertaining to a group, wherein a value of the data isolation field identifies a subgroup of the group;

if said determining determines that no table in the query comprises the data isolation field then performing database server steps of forwarding the query to a database server which is coupled to a database comprising tables having the data isolation field, receiving a response to the query from the database server, and forwarding the response to the application server, but if said determining determines that at least one table in the query comprises the data isolation field then ascertaining whether the query includes a Where-type clause comprising the data isolation field;

if said ascertaining ascertains that the query includes a Where-Type clause comprising the data isolation field then performing the database server steps, but if said ascertaining ascertains that the query does not include a Where-Type clause comprising the data isolation field then performing error recording and notification steps of recording that a query error has occurred and returning an error code and/or empty dataset to the application server, wherein the receiving step, the determining step, the ascertaining step, the database server steps, and the error recording and notification steps are performed by the proxy server.

The present invention provides a computer program product, comprising a computer usable medium having a computer readable program code embodied therein, said computer readable program code comprising a proxy server adapted to implement a method for processing a database query by the proxy server, said method comprising:

receiving the query from an application server, wherein the query is a request for data stored within N databases, wherein N is at least 2, wherein the N databases comprise database tables that include a data isolation field pertaining to a group comprising a plurality of subgroups, wherein a value of the data isolation field identifies a subgroup of the group, wherein at least one database of the N databases includes a common database of tables comprising data that is not specific to any subgroup of the group, wherein the proxy server is adapted to communicate with N database servers, and wherein the N database servers are respectively coupled to the N databases;

making a determination of whether any database table in the query comprises a data isolation field pertaining to a group, wherein a value of the data isolation field identifies a subgroup of the group;

if said making a determination makes a determination that no table in the query comprises the data isolation field then performing database common steps of forwarding the query to a common database server of the N database servers which can access the common database, receiving a response to the query from the common database server, and forwarding the response from the common database server to the application server, but if said making a determination makes a determination that at least one table in the query comprises the data isolation field then determining whether the query includes a Where-type clause comprising the data isolation field;

if said determining determines that the query does not include a Where-type clause comprising the data isolation field then performing error steps comprising returning an error code and/or empty dataset to the application server, but if said determining determines that the query includes a Where-type clause comprising the data isolation field then ascertaining whether the value of the data isolation field in the query is valid for a specific server of the N database servers;

if said ascertaining ascertains that the value of the data isolation field in the query is valid for a specific database server of the N database servers then performing database server steps of forwarding the query to the specific database server, receiving a response to the query from the specific database server, and forwarding the response from the specific database server to the application server, but if said ascertaining ascertains that the value of the data isolation field in the query is not valid for a specific database server of the N database servers then performing said error steps, wherein the receiving step, the determining step, the ascertaining step, the database common steps, the database server steps, and the error steps are performed by the proxy server.

The present invention advantageously provides a method, system, and computer program product for processing a query for applications in a shared multi-customer environment in a manner that mitigates or eliminates design features which compromise security and/or efficiency and/or functionality of e-utilities built upon those applications.

DETAILED DESCRIPTION OF THE INVENTION

A database table comprises columns and rows. Definitionally, a "record" of a database table is a row of the database table, and a "field" of the database denotes a column of the database table.

A group may comprise subgroups, and data specific to the subgroups may be stored in one or more databases. The one or more databases may be relational databases or non-relational databases. In addition, the one or more databases may comprise "common data", wherein common data is defined as data that is not specific to a subgroup and may be utilized by any subgroup. The common data may include, inter alia: zip codes, tax brackets, time zone names and offsets, etc. The group may be comprise an organization such that the subgroups are departments of the organization. The group may comprise a user group such that the subgroups represent different classes of users. The organization may comprise, inter alia, a company such as a corporation, a governmental agency, a labor union, a charitable organization, a sports or entertainment organization such as a football team, an educational organization such as a university, etc. For simplicity of presentation, the embodiments of the present invention will be described infra in terms of a company and its departments. Nonetheless, the scope of the present invention applies more generally to any group and its subgroups such that data specific to the subgroups may be stored in one or more databases. Thus, whatever is described and disclosed herein for the company and its departments is applicable more generally to any group and its subgroups, respectively.

The number of databases and the distribution of the data specific to the departments differs for different embodiments of the present invention. In a first embodiment of the present invention, the data specific to the departments is stored in a single database which is accessed by a single database server, as discussed infra in conjunction with FIGS. 1-2. In a second embodiment of the present invention, the data specific to the departments is stored in a plurality of databases, wherein each database of the plurality of databases is accessed by its own database server, as discussed infra in conjunction with FIGS. 3-4. Each embodiment of the present invention includes the use of database tables stored in the single database in the first embodiment and in the plurality of databases in the second embodiment. The database tables may comprise department-specific records and a data isolation field. The data isolation field identifies the department associated with a department-specific record. The present invention provides a method and system which utilize the data isolation field to properly isolate data in the department-specific records in response to a database query for data from the single database or from the plurality of databases. If a database query is made for data stored in the single database of FIGS. 1-2 or in the plurality of databases in FIGS. 3-4, then the data isolation techniques of the present invention ensure that the database query obeys data isolation rules as disclose herein in the flow charts of FIGS. 2 and 4, described infra. The originating sender of the database query may be the application server 12 of FIG. 1 or 3, discussed infra.

Figure 1:
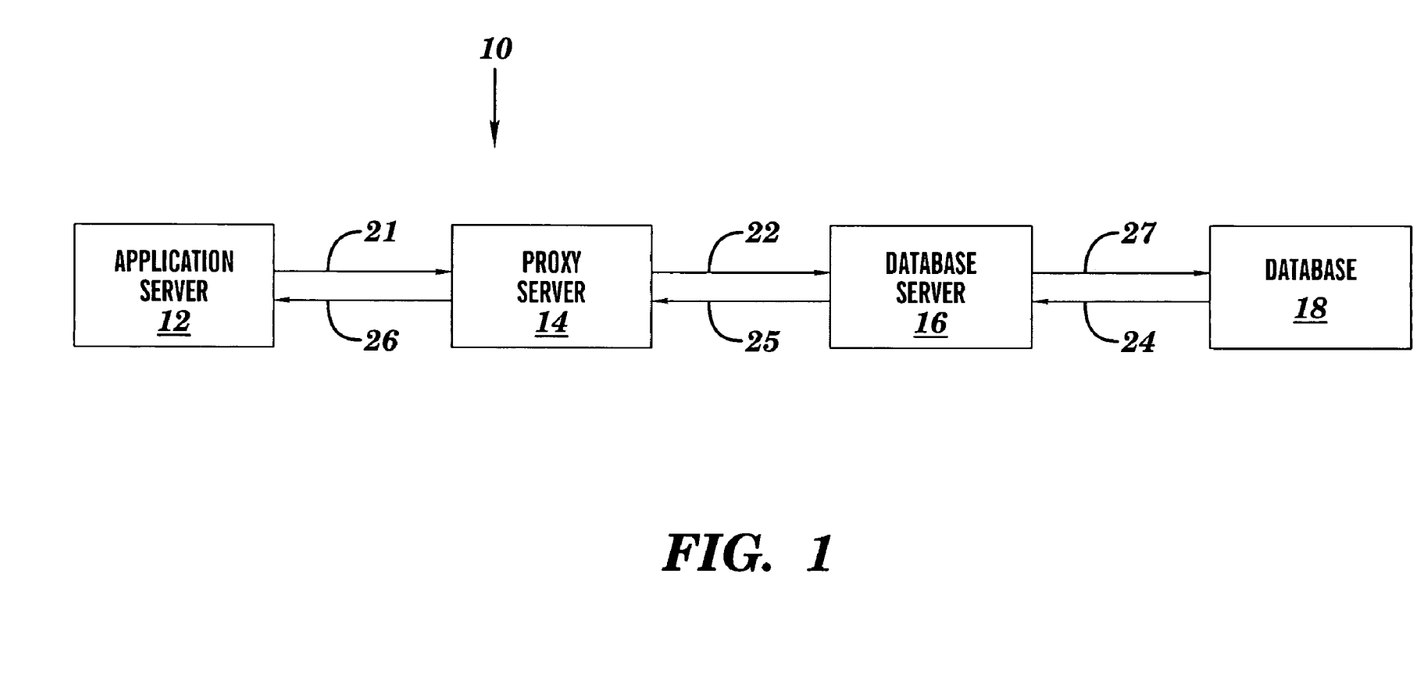
FIG. 1 depicts a block diagram of a system in which a proxy server is adapted to process a database query from an application server for data stored in a database, in accordance with embodiments of the present invention.

FIG. 1 depicts a block diagram of a system 10 in which a proxy server 14 is interposed between an application server 12 and a database server 16, in accordance with embodiments of the present invention. The database server 16 is coupled to a database 18. The database server 16 is a software module that receives and processes queries for data from the database 18. The application server 12 is a software module comprising application software that utilizes data stored in the database 18. The proxy server 14 is a software module comprising software that is adapted to intercept and process a database query comprised by signal 21 transmitted from the application server 12 and directed to the database server 16. Thus, the application server 12 may be an originating sender of the database query. The database query is a query for data stored in the database 18 such that the query is intended to be received and processed by the database server 16. The proxy server 14 may be transparent to both the application server 12 and the database server 16. The signal 21 comprising the database query is transmitted by the application server 12 and is subsequently intercepted by the proxy server 14, such that the database query is initially prevented from reaching the database server 16. The proxy server 14 examines the database query and returns a result to the application server 12 via signal 26. The content of the result in the signal 26 depends on what the proxy server determines from examining the database query, as described infra in conjunction with FIG. 2.

The examination of the database query by the proxy server 14 may result in the database query being transmitted from the proxy server 14 to the database server 16 via signal 22, followed by processing the database query by the database server 16. The processing of the database query by the database server 16 may result in a request being transmitted from the database server 16 to the database 18 via signal 27 for data requested by the database query. The data requested by the database query is transmitted from the database 18 to the database server 16 via signal 24, followed by transmission of said requested data from the database server 16 to the proxy server 14 via signal 25, and further followed by including said requested data in the result that is transmitted from the proxy server 14 to the application server 12 via signal 26.

The examination of the database query by the proxy server 14 may alternatively result in the database query not being sent from the proxy server 14 to the database server 16. Instead, the result transmitted from the proxy server 14 to the application server 12 may include an empty dataset and/or an error code as described infra in conjunction with step 150 of FIG. 2. A dataset is defined herein as a set of data, and an empty dataset is defined herein as an empty set of data.

The database 18 may comprises database tables containing department-specific information such that each such database table comprises a data isolation field, wherein the data isolation field is identified by a configuration parameter which distinguishes records of data associated with different departments. Thus, when a table is said to comprise a configuration parameter, it is understood that the table comprises a data isolation field whose name is the configuration parameter. The proxy server 14 is assumed to have knowledge of the identity of the configuration parameter prior to intercepting a database query transmitted by the application server 12. All tables of the database 18 need not comprise the configuration parameter. For example, a table having common data therein may not comprise the configuration parameter.

Table 1 provides an example of a database table EMPLOYEES1 within the database 18. The EMPLOYEES1 database table includes data associated with employees of a company.

TABLE 1

EMPLOYEES1 Table.

| Record | EMP_ID | NAME | BIRTH_DATE | SSN | DEPT |
|---|---|---|---|---|---|
| 1 | 1 | John Williams | Aug. 19, 1966 | 055-55-7080 | 45 |
| 2 | 2 | Mike Marcus | Dec. 11, 1980 | 031-31-9920 | 45 |
| 3 | 3 | Linda Cox | Feb. 28, 1975 | 398-08-5372 | 45 |
| 4 | 4 | Sandy Rice | Jan. 03, 1958 | 511-98-6324 | 21 |
| 5 | 5 | Roy Ward | Aug. 08, 1949 | 623-71-2342 | 21 |
| 6 | 6 | Jim McCarthy | May 12, 1939 | 645-34-3432 | 21 |
| 7 | 7 | Alan Sikorsky | Jul. 11, 1975 | 324-23-6543 | 83 |
| 8 | 8 | Thomas Weiss | Jun. 30, 1940 | 424-74-8436 | 83 |
| 9 | 9 | Vito Brindisi | Jan. 05, 194 | 337-85-2594 | 83 |

The EMPLOYEES1 database table includes the fields of: EMP_ID, NAME, BIRTH_DATE, SSN and DEPT. The EMP_ID field denotes an employee identification number or symbol, the NAME field identifies the employee's name, the BIRTH_DATE field identifies the employee's date of birth, the SSN field identifies the employee's social security number, and the DEPT field identifies the department number of the department in which the employee works. The DEPT field is the data isolation field. Thus, DEPT is the configuration parameter which distinguishes records of data associated with different departments. The department numbers of 45, 21, and 83 appear in the DEPT field. Table 1 has 9 rows. Rows 1-3 include records of data specific to department 45, rows 4-6 include records of data specific to department 21, and rows 7-9 include records of data specific to department 83.

Figure 2:
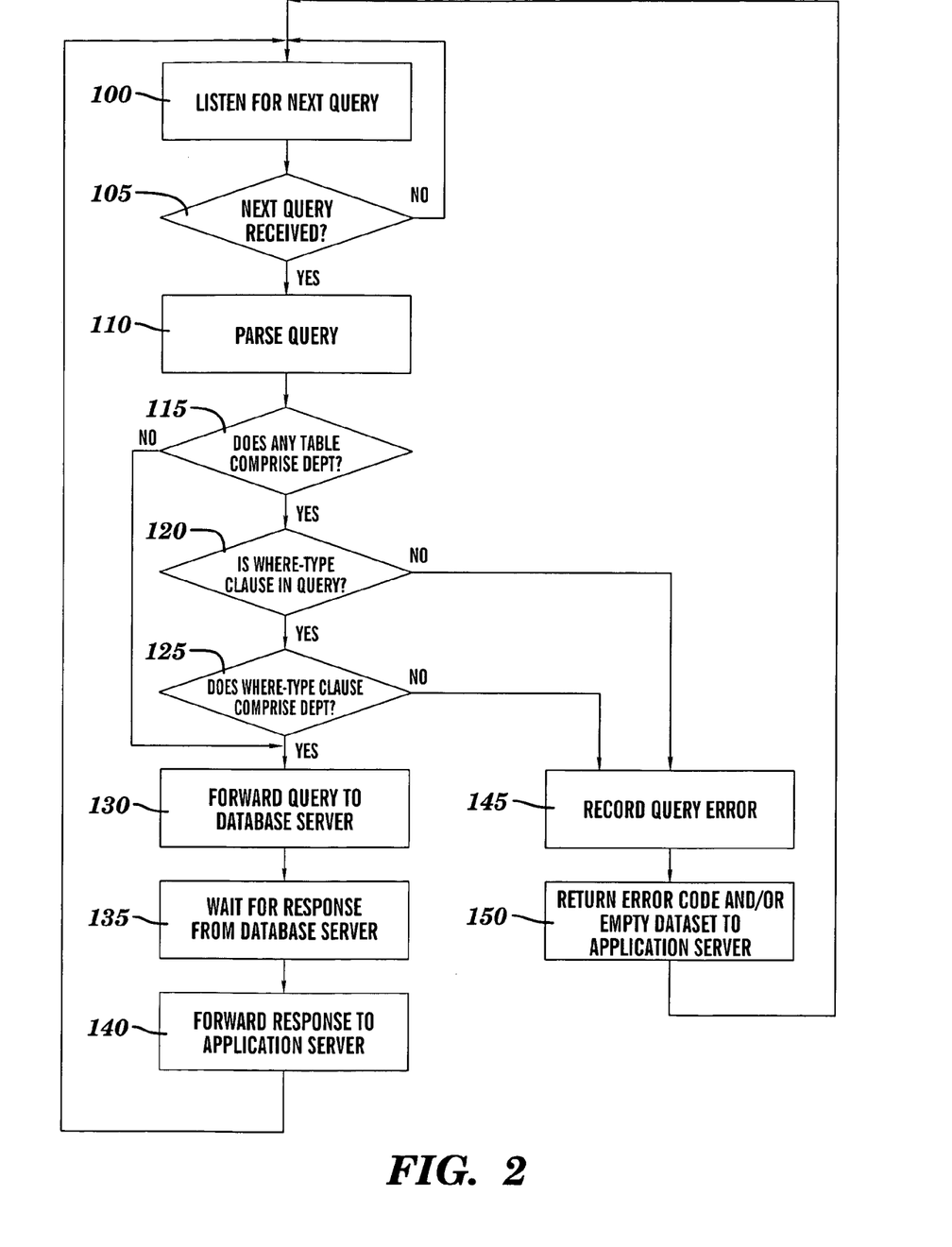
FIG. 2 is a flow chart illustrating a method by which the proxy server of FIG. 1 processes the database query, in accordance with embodiments of the present invention.

FIG. 2 is a flow chart illustrating a method by which the proxy server 14 of FIG. 1 examines the database query received from the application server 12 via signal 21, in accordance with embodiments of the present invention. In step 100, the proxy server 14 listens for a database query transmitted from the application server 12 via signal 21. Listening for the database query means having an operational mechanism for receiving the database query. Such an operational mechanism for receiving the database query may comprise, inter alia, a read buffer for receiving the database query.

The database query is for records of data from one or more tables in the database 18. The database query may be formatted in any manner. As an example, the database query may be a Structured Query Language (SQL) query. The proxy server 14 is assumed to know initially (i.e., prior to step 100) that the configuration parameter is DEPT. The proxy server 14 may also know initially whether each database table in the database 18 comprises the configuration field. Alternatively, the proxy server 14 may issue a query to the database server 16 for information which proxy server 14 may use to determine whether each database table in the database 18 comprises the configuration field, such as by issuing a SQL query "DESCRIBE SELECT * FROM EMPLOYEES1" upon the system startup, or at the first time that the proxy server 14 intercepts a database query from the application server 12, or at any other time before the proxy server 14 requires knowledge of whether the database tables in the database 18 comprises the configuration field.

In step 105, the proxy server 14 makes a determination of whether the next database query has been received by the proxy server 14. Such a determination may be made in any manner such as by checking a read buffer for the existence of the database query. If the proxy server 14 determines that the next database query has not been received by the proxy server 14, then the method loops back to step 100. If the proxy server 14 determines that the next database query has been received by the proxy server 14, then step 110 is next executed.

In step 110, the proxy server 14 parses the received query, which is a string of characters, into its substituent substrings while keeping track of the sequential order of the substrings. For example, consider the following SQL query received by the proxy server 14: SELECT NAME, BIRTH_DATE FROM EMPLOYEES1 WHERE DEPT='23'. The preceding SQL query may be parsed into the following substrings: "NAME", "BIRTH_DATE", "EMPLOYEES", and "WHERE DEPT='23'". The substrings "NAME" and "BIRTH_DATE" identify the fields to be returned to the application server 12. The substring "EMPLOYEES1" identifies the table to be accessed from the database 18. The modifying clause "WHERE DEPT='23'" identifies the rows to be returned. The preceding parsing scheme is merely illustrative, and the scope of the present invention includes any parsing scheme that facilitates a logical analysis of the database query. Alternatively, the proxy server 14 may analyze the content of the query by any method of analysis, including any method that does not require parsing the query.

Note that a WHERE clause in a SQL statement denotes a constraint that limits the set of rows to be returned from processing the SQL query. Since the scope of the present invention includes use not only of SQL but also of any database query language, the phrase "WHERE-type clause" is defined herein as a clause in a database query which limits the set of rows to be returned from processing a database query and may be identified by the word WHERE or in some other manner. For SQL, the WHERE-type clause is a SQL WHERE clause.

Next, the proxy server 14 performs an examination of the substrings resulting from the parsing step 110 to determine whether there is a data isolation problem associated with the database query. This determination is made in accordance with data isolation rules defined by the logic of steps 115, 120, and 125. Steps 115, 120, and 125 may be analyzed by examining the substrings resulting from the parsing step 110 or by any other method as discussed supra. If no database table invoked in the database query comprises the configuration parameter, then the data in the database tables invoked by the database query are assumed to not be department specific, so that there is no data isolation problem. Such data that is not department specific may be "common data" which has been defined supra. On the other hand, if at least one database table invoked in the database query comprises the configuration parameter, then the data in the database tables invoked by the database query are assumed to be department specific, so that a WHERE-type clause having the configuration parameter must be present in the database query in order to avoid a data isolation problem.

In accordance with the data isolation rules implemented by steps 115, 120, and 125, a data isolation problem associated with the database query exists if: at least one database table invoked in the database query comprises the configuration parameter AND the database query does not comprise a WHERE-type clause containing the configuration parameter. Alternatively, there is no data isolation problem associated with the database query if: no database table invoked in the database query comprises the configuration parameter OR (at least one database table invoked in the database query comprises the configuration parameter AND the database query comprises a WHERE-type clause containing the configuration parameter).

In step 115, the proxy server 14 makes a determination of whether any of the database tables in the database query comprise the configuration parameter (i.e., DEPT in the example of Table 1). If step 115 determines that none of the database tables in the associated with the database query comprise the configuration parameter, then there is no data isolation problem associated with the database query and step 130 is next executed. As an example, consider the SQL database query SELECT ZIP, POPULATION FROM CITY WHERE ZIP=12345, wherein the database table CITY does not comprise the configuration parameter. In the absence of the configuration parameter, the table CITY is assumed to not comprise department-specific data, so that there is no data isolation problem. If step 115 determines that at least one of the database tables in the database query comprises the configuration parameter, then there is a potential data isolation problem associated with the database query (depending on whether the database query comprises a WHERE-type clause having the configuration parameter) and step 120 is next executed.

In step 120, the proxy server 14 makes a determination of whether the database query comprises a WHERE-type clause. If step 120 determines that the database query does not comprise a WHERE-type clause, then there is a data isolation problem associated with the database query and step 145 is next executed. If step 120 determines that the database query comprises a WHERE-type clause, then there is a potential data isolation problem associated with the database query and step 125 is next executed.

In step 125, the proxy server 14 makes a determination of whether the WHERE-type clause in the database query comprises the configuration parameter. If step 125 determines that the WHERE-type clause in the database query comprises the configuration parameter, then there is no data isolation problem associated with the database query and step 130 is next executed. If step 125 determines that the WHERE-type clause in the database query does not comprise the configuration parameter, then there is a data isolation problem associated with the database query and step 145 is next executed.

Steps 130, 135, and 140 are executed in sequence and pertain to the situation in which there is no data isolation problem associated with the database query. The proxy server 14: forwards the database query to the database server 16 (step 130); waits for a response from the database server 16 (step 135); and forwards the response from the database server 16 to the application server 12 via signal 26 (step 140). Following execution of steps 130, 145, and 140, the method loops back to step 100 so that the proxy server 14 may intercept and process the next database query transmitted by the application server 12.

Steps 145 and 150 are error steps which may be executed in any sequence and pertain to the situation in which there is a data isolation problem associated with the database query. The proxy server 14 performs: recording the fact that a query error has occurred such as by logging the existence of an invalid database query (step 145); and returning an error code to the application server 12 via signal 26 (step 150). Instead of returning an error code to the application server 12, step 150 may alternatively return an empty dataset to the application server 12 via signal 26. Note that step 145 is optional and may be omitted. Following execution of steps 145 and 150, the method loops back to step 100 so that the proxy server 14 may listen for, intercept, and process the next database query transmitted by the application server 12.

If the database 18 is a relational database, then database tables of the database 16 may be normalized to second normal form, wherein a first and second database table in the database 18 are related such that a field of the second table is a foreign key of the first table. Accordingly, assuming that the database query invokes the first and/or second database table, the first and second database tables are not required to both comprise the configuration parameter, since the configuration parameter is known for both tables so long as at least one table of the first table and the second table comprises the configuration parameter. Thus, if the first database table has a column consisting of the configuration parameter (or data isolation field), and if the second database table does not have a column consisting of the configuration parameter (or data isolation field), then the second database table may comprise the configuration parameter (or data isolation field) through the linkage of the second database table to the first database table via the foreign key. When database tables of the database 16 are normalized to second normal form, it may be convenient to label the first database table as a primary table and the second database table as a secondary table.

Figure 3:
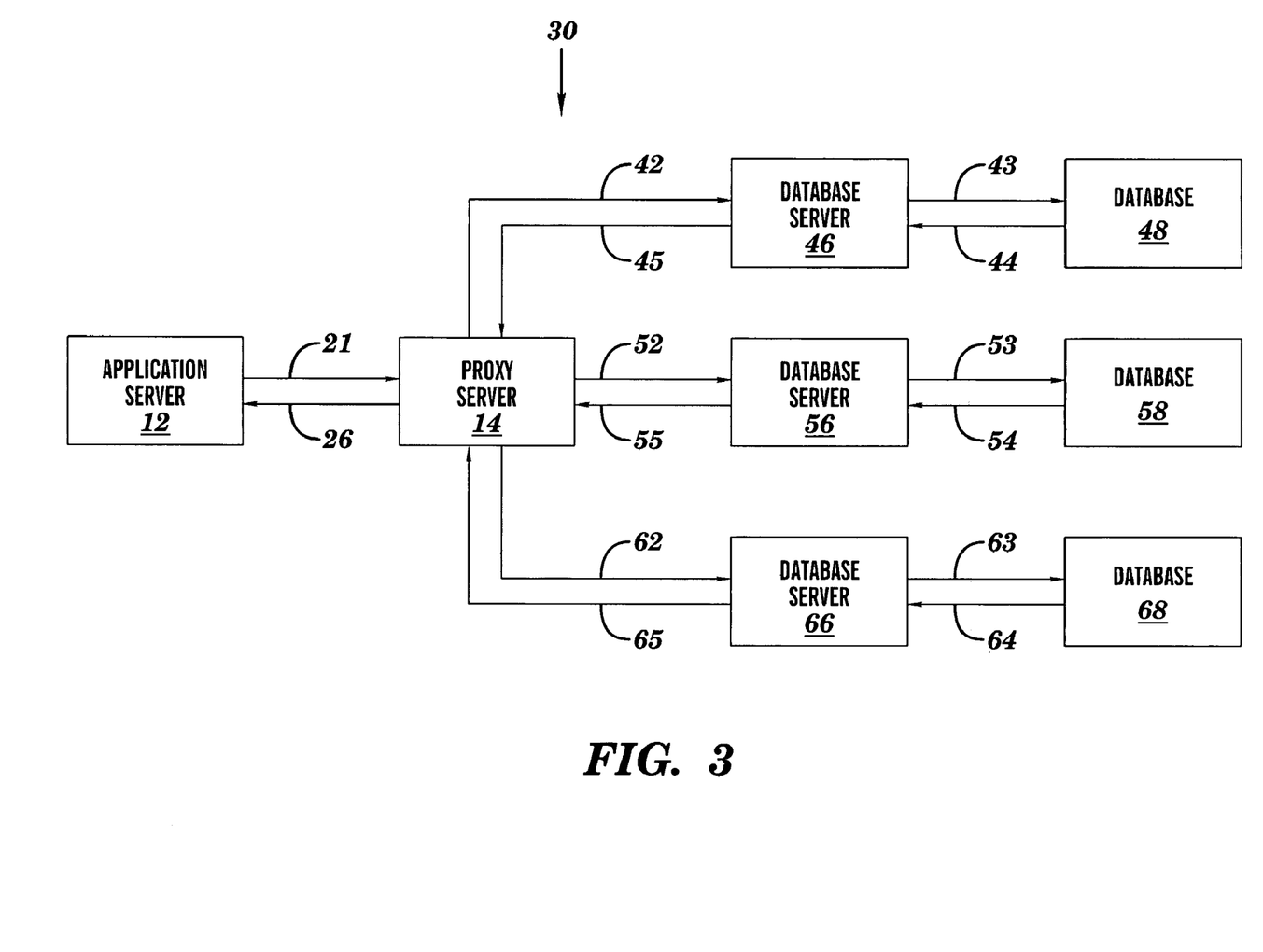
FIG. 3 depicts a block diagram of a system in which a proxy server is adapted to process a database query from an application server for data stored within a plurality of databases, in accordance with embodiments of the present invention.

FIG. 3 depicts a block diagram of a system 30 in which the proxy server 14 is interposed between the application server 12 and database servers 46, 56, and 66 representing a plurality of database servers generally, in accordance with embodiments of the present invention. The database server 46 is coupled to database 48, the database server 56 is coupled to database 58, the database server 66 is coupled to database 68. Each database of databases 48, 58, and 68 comprises data specific to one or more departments. As a special case, each database of databases 48, 58, and 68 may comprise data specific to one and only one department. The database server 46 is a software module that receives and processes queries for data from the database 48, the database server 56 is a software module that receives and processes queries for data from the database 58, and the database server 66 is a software module that receives and processes queries for data from the database 68. The application server 12 is a software module comprising application software that utilizes data stored in at least one of the databases 48, 58, and 68. The software in the proxy server 14 is adapted to intercept and process a database query comprised by signal 21 transmitted from the application server 12. Thus, the application server 12 may be an originating sender of the database query. The proxy server 14 may be transparent to the application server 12 and to the database servers 46, 56, and 66. The signal 21 comprising the database query is transmitted by the application server 12 and is subsequently intercepted by the proxy server 14, such that the database query is initially prevented from reaching the database server 46, 56, or 66. The proxy server 14 examines the database query and returns a result to the application server 12 via signal 26. The content of the result in the signal 26 depends on what the proxy server determines from examining the database query, as described infra in conjunction with FIG. 4.

The examination of the database query by the proxy server 14 may result in the database query being transmitted from the proxy server 14 to the database server 46, 56, or 66 via a signal 42, 52, or 62, followed by processing the database query by the database server 46, 56, or 66, respectively. The processing of the database query by the database server 46, 56, or 66 may result in a request being transmitted from the database server 46, 56, or 66 to the database 48, 58, or 68 via signal 43, 53, or 63, respectively, for data identified by the database query. The data requested by the database query is transmitted from the database 48, 58, or 68 to the database server 46, 56, 66 via signal 44, 54, or 64, followed by transmission of the data requested by the database query from the database server 46, 56, or 66 to the proxy server 14 via signal 45, 55, or 65, respectively, and further followed by including the data identified by the database query in the result that is transmitted from the proxy server 14 to the application server 12 via signal 26.

The examination of the database query by the proxy server 14 may alternatively result in the database query not being sent from the proxy server 14 to the database server 46, 56, or 66. Instead, the result transmitted from the proxy server 14 to the application server 12 may include an empty dataset and/or an error code as describe infra in conjunction with step 240 of FIG. 4.

The databases 48, 58, and 68 may each comprise database tables containing information specific to one or more departments such that some database tables comprises a data isolation field, wherein the data isolation field is identified by a configuration parameter which distinguishes records of data associated with different departments. For the special case in which the databases 48, 58, and 68 each comprise database tables containing information specific to one and only one department, there is a value of the configuration parameter that is specific to each database of database 48, 58, and 68 and to each database server of database servers 46, 56, and 66. The proxy server 14 is assumed to have knowledge of the identity of the configuration parameter prior to intercepting a database query transmitted by the application server 32. All tables of each database of the databases 48, 58, and 68 need not comprise the configuration parameter. For example, a table having common data therein does not comprise the configuration parameter.

Table 2, 3, and 4 provides an example of database tables EMPLOYEES2, EMPLOYEES3, and EMPLOYEES4 within the database 48, 58, and 68, respectively.

TABLE 2

EMPLOYEES2 Table.

| Record | EMP_ID | NAME | BIRTH_DATE | SSN | DEPT |
|---|---|---|---|---|---|
| 1 | 1 | John Williams | Aug. 19, 1966 | 055-55-7080 | 45 |
| 2 | 2 | Mike Marcus | Dec. 11, 1980 | 031-31-9920 | 45 |
| 3 | 3 | Linda Cox | Feb. 28, 1975 | 398-08-5372 | 45 |

TABLE 3

EMPLOYEES3 Table.

| Record | EMP_ID | NAME | BIRTH_DATE | SSN | DEPT |
|---|---|---|---|---|---|
| 1 | 4 | Sandy Rice | Jan. 03, 1958 | 511-98-6324 | 21 |
| 2 | 5 | Roy Ward | Aug. 08, 1949 | 623-71-2342 | 21 |
| 3 | 6 | Jim McCarthy | May 12, 1939 | 645-34-3432 | 21 |

TABLE 4

EMPLOYEES4 Table.

| Record | EMP_ID | NAME | BIRTH_DATE | SSN | DEPT |
|---|---|---|---|---|---|
| 1 | 7 | Alan Sikorsky | Jul. 11, 1975 | 324-23-6543 | 83 |
| 2 | 8 | Thomas Weiss | Jun. 30, 1940 | 424-74-8436 | 83 |
| 3 | 9 | Vito Brindisi | Jan. 05, 194 | 337-85-2594 | 83 |

The EMPLOYEES2 table includes data associated with employees of department 45 of a company, the EMPLOYEES3 table includes data associated with employees of department 21 of the company, and the EMPLOYEES4 table includes data associated with employees of department 83 of the company. The EMPLOYEES2, EMPLOYEES3, and EMPLOYEES4 database tables depicted in Tables 2, 3, and 4, respectively, each comprise the configuration parameter DEPT for data isolation purposes. The EMPLOYEES2, EMPLOYEES3, and EMPLOYEES4 database tables depicted in Tables 2, 3, and 4, respectively, have the same data collectively as the data in the EMPLOYEES1 database table depicted in Table 1. However, the EMPLOYEES2, EMPLOYEES3, and EMPLOYEES4 database tables each have data specific to one and only one department, whereas the EMPLOYEES1 database table has data specific to all three departments. Thus, the configuration parameter has a value of 45 that is specific to database 48 and database server 46, the configuration parameter has a value of 21 that is specific to database 58 and database server 56, and configuration parameter has a value of 83 that is specific to database 68 and database server 66. It is noted that corresponding database tables in the databases of the plurality of databases have the same table structure (including the same field), as may be verified for the corresponding database tables EMPLOYEES2, EMPLOYEES3, and EMPLOYEES4 having the same fields EMP_ID, NAME, BIRTH_DATE, SSN, and DEPT.

Alternatively, a database of FIG. 3 could store data for more than one department. For example, the database 48 may alternatively store the data for departments 45 and 93 in the EMPLOYEES5 table as shown in Table 5.

servers and transmit the response to the application server. But this second approach saves data storage space and simplifies updating the common data (i.e., the second approach updates only one version of the tables to be updated, whereas the first approach also updates the duplicate copies of the tables to be updated). Definitionally, a "common database" is an existing database which comprises the common data tables. In the first approach, each database (i.e., each database of databases 48, 58, and 68) is a common database. In the second approach, only one database (i.e., one database of databases 48, 58, and 68) is a common database.

Figure 4:
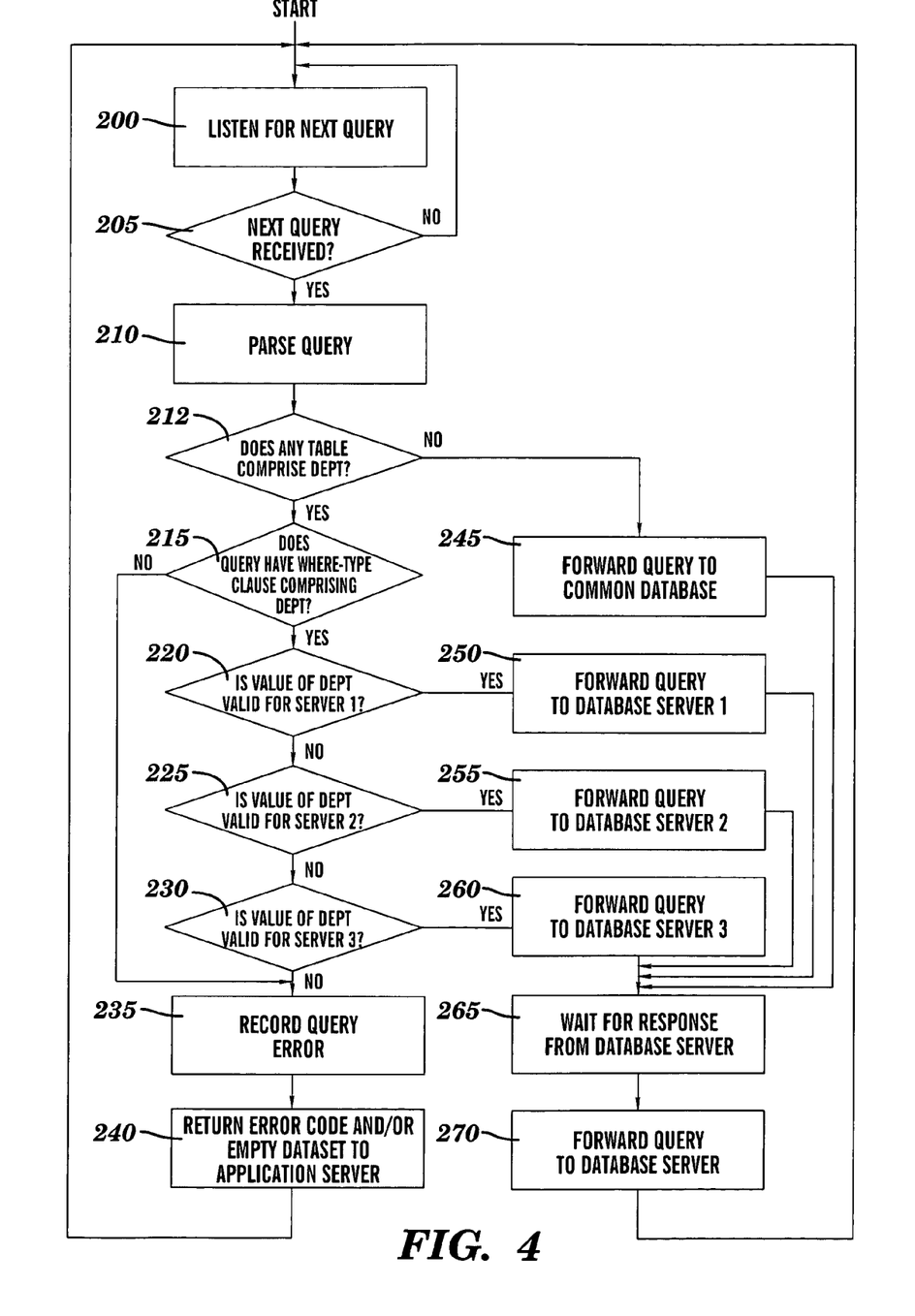
FIG. 4 is a flow chart illustrating a method by which the proxy server of FIG. 3 processes the database query, in accordance with embodiments of the present invention.

FIG. 4 is a flow chart illustrating a method by which the proxy server 14 of FIG. 3 examines the database query received from the application server 12 via signal 26, in accordance with embodiments of the present invention. In step 200, the proxy server 14 listens for a database query transmitted from the application server 12 via signal 21. The database query is for records of data from at least one database of databases 48, 58, and 68. The database query may be formatted in any manner. As an example, the database query may be a Structured Query Language (SQL) query. The proxy server 14 is assumed to know initially (i.e., prior to step 200) that the configuration parameter is DEPT. The proxy server 14 may also know initially whether each database table in the plurality of databases comprises the configuration field. Alternatively, the proxy server 14 may issue a query to one of the database servers 46, 56, or 66 for information which proxy server 14 may use to determine whether each database table in the corresponding database 48, 58, or 68 comprises the configuration field, such as by issuing a SQL query "DESCRIBE SELECT * FROM EMPLOYEES" upon the system startup, or at the first time that the proxy server 14 intercepts a data-

TABLE 5

EMPLOYEES5 Table.

| Record | EMP_ID | NAME | BIRTH_DATE | SSN | DEPT |
|---|---|---|---|---|---|
| 1 | 1 | John Williams | Aug. 19, 1966 | 055-55-7080 | 45 |
| 2 | 2 | Mike Marcus | Dec. 11, 1980 | 031-31-9920 | 45 |
| 3 | 3 | Linda Cox | Feb. 28, 1975 | 398-08-5372 | 45 |
| 4 | 10 | Bill Savon | Apr. 21, 1971 | 021-33-9231 | 93 |
| 5 | 11 | Joyce Calone | Mar. 07, 1955 | 590-29-6295 | 93 |
| 6 | 12 | Alice Durk | Nov. 23, 1947 | 094-19-0218 | 93 |
| 7 | 13 | Gary Fedette | Jan. 30, 19768 | 210-58-1231 | 93 |

Thus, in this alternative aspect of the second embodiment of the present invention, at least one database of the plurality of databases includes a plurality of departments. This alternative aspect may be practical where the individual departments included in one database do not engage in sufficient database activity and/or do not have a sufficient amount of stored data to justify allocating a whole database to each such department.

The embodiment of FIG. 3 permits common data to be stored in various ways. A first approach is to duplicate the common data tables onto all database servers (i.e., database servers 46, 56, and 66). This first approach simplifies the proxy server implementation, since no matter what database server the query has been forwarded to for processing, it is certain that all the tables of common data can be found in a database coupled to that server. A second approach is to store the common data tables on only one database server. This second approach is more difficult to implement than the first approach, because it is the proxy server who will possibly need to bring in all the necessary data from two database base query from the application server 12, or at any other time before the proxy server 14 requires knowledge of whether database tables in the database 48, 58, and 68 comprise the configuration field.

In step 205, the proxy server 14 makes a determination of whether the next database query has been received by the proxy server 14. Such a determination may be made in any manner such as by checking a read buffer for the existence of the database query. If the proxy server 14 determines that the next database query has not been received by the proxy server 14, then the method loops back to step 200. If the proxy server 14 determines that the next database query has been received by the proxy server 14, then step 210 is next executed.

In step 210, the proxy server 14 parses the received query, which is a string of characters into its substituent substrings while keeping track of the sequential order of the substrings. The parsing in step 210 of FIG. 4 is analogous to the parsing in step 110 of FIG. 2 described supra.

Next, the proxy server 14 performs an examination of the substrings resulting from the parsing step 210 to determine whether there is a data isolation problem associated with the database query. This determination is made in accordance with data isolation rules defined by the logic of steps 212, 215, 220, 225, and 230. Steps 212, 215, 220, 225, and 230 are analyzed by examining the substrings resulting from the parsing step 210 or by any other method as discussed supra.

In step 212, the proxy server 14 makes a determination of whether any of the database tables in the database query comprise the configuration parameter (i.e., DEPT in the example of Table 3). If step 212 determines that none of the database tables in the associated with the database query comprise the configuration parameter, then there is no data isolation problem because the query is for common data, which results in the query being forwarded to a common database in step 245, followed by execution of step 265. If step 212 determines that at least one of the database tables in the database query comprises the configuration parameter, then there is a potential data isolation problem associated with the database query and step 215 is next executed.

In step 215, the proxy server 14 makes a determination of whether the database query comprises a WHERE-type clause containing the configuration parameter DEPT. If step 215 determines that the database query does not comprise a WHERE-type clause containing the configuration parameter DEPT, then there is a query error and step 235 is next executed. If step 215 determines that the database query comprises a WHERE-type clause containing the configuration parameter DEPT, then there is a potential data isolation problem associated with the database query and step 220 is next executed.

In the execution of steps 220, 225, and 230, it is assumed that database servers 1, 2, and 3 of FIG. 4 respectively correspond to database servers 46, 56, and 66 of FIG. 3. In steps 220, 225, and 230, the proxy server 14 makes a determination of whether the value of the configuration parameter DEPT is valid for database server 1, 2, or 3, respectively. The value of the configuration parameter DEPT is said to be valid for database server M (M=1, 2, 3) if the database coupled to the database server M includes tables comprising the value of the configuration parameter DEPT.

In step 220, the proxy server 14 makes a determination of whether the value of the configuration parameter DEPT in the query is valid for database server 1 (i.e., if the value of the configuration parameter DEPT in the query identifies the department number associated with database tables in the database 48 that is coupled to the database server 1). If step 220 determines that the value of the configuration parameter DEPT in the query is valid for database server 1, then there is no data isolation problem associated with the database query and the query is forwarded by the proxy server 14 to the database server 1 in step 250, followed by execution of step 265. If step 220 determines that the value of the configuration parameter DEPT in the query is not valid for database server 1, then step 225 is next executed.

In step 225, the proxy server 14 makes a determination of whether the value of the configuration parameter DEPT in the query is valid for database server 2 (i.e., if the value of the configuration parameter DEPT in the query identifies the department number associated with database tables in the database 58 that is coupled to the database server 2). If step 225 determines that the value of the configuration parameter DEPT in the query is valid for database server 2, then there is no data isolation problem associated with the database query and the query is forwarded by the proxy server 14 to the database server 2 in step 255, followed by execution of step 265. If step 225 determines that the value of the configuration parameter DEPT in the query is not valid for database server 2, then step 230 is next executed.

In step 230, the proxy server 14 makes a determination of whether the value of the configuration parameter DEPT in the query is valid for database server 3 (i.e., if the value of the configuration parameter DEPT in the query identifies the department number associated with database tables in the database 68 that is coupled to the database server 3). If step 230 determines that the value of the configuration parameter DEPT in the query is valid for database server 3 then there is no data isolation problem associated with the database query and the query is forwarded by the proxy server 14 to the database server 3 in step 260, followed by execution of step 265. If step 230 determines that the value of the configuration parameter DEPT in the query is not valid for database server 3, then step 225 is next executed.

While steps 220, 230, and 235 describe an example characterized by three database servers and three associated databases, the scope of the present invention generally includes N database servers and N associated databases where N is an integer of at least 2. For the case of N database servers and N associated databases, the three steps of 220, 230, and 235 respectively relating to database servers 1, 2, 3, are replaced by N analogous steps respectively relating to database servers 1, 2, . . . , N.

Steps 265 and 270 are database query steps which pertain to the situation in which there is no data isolation problem associated with the database query. In step 265, the proxy server 14 waits for a response from the pertinent database server (i.e, the server containing the common database, database server 1, database server 2, or database server 3. depending on whether the previously executed step was step 245, 250, 255, or 260). In step 270, the proxy server 14 forwards the response from the pertinent database server to the application server 12 via signal 26. Following execution of steps 265 and 270, the method loops back to step 200 so that the proxy server 14 may intercept and process the next database query transmitted by the application server 12.

Steps 235 and 240 are error steps which may be executed in any sequence and pertain to the situation in which there is a data isolation problem associated with the database query. The proxy server 14 performs: recording the fact that a query error has occurred such as by logging the existence of an invalid database query (step 235); and returning an error code to the application server 12 via signal 26 (step 240). Instead of returning an error code to the application server 12, step 240 may alternatively return an empty dataset to the application server 12 via signal 26. Note that step 235 is optional and may be omitted. Following execution of steps 235 and 240, the method loops back to step 200 so that the proxy server 14 may listen for, intercept, and process the next database query transmitted by the application server 12.

If the database 48, 58, or 68 is a relational database, then database tables of the database 48, 58, or 68 may be normalized to second normal form, wherein a first and second database table in the database 48, 58, or 68 are related such that a field of the second table is a foreign key of the first table. Accordingly, assuming that the database query invokes the first and/or second database table, the first and second database tables are not required to both comprise the configuration parameter, since the configuration parameter is known for both tables so long as at least one table of the first table and the second table comprises the configuration parameter. Thus, if the first database table has a column consisting of the configuration parameter (or data isolation field), and if the second database table does not have a column consisting of the configuration parameter (or data isolation field), then the second database table may comprise the configuration parameter (or data isolation field) through the linkage of the second database table to the first database table via the foreign key. When database tables of the database 48, 58, or 68 are normalized to second normal form, it may be convenient to label the first database table as a primary table and the second database table as a secondary table.

Figure 5:
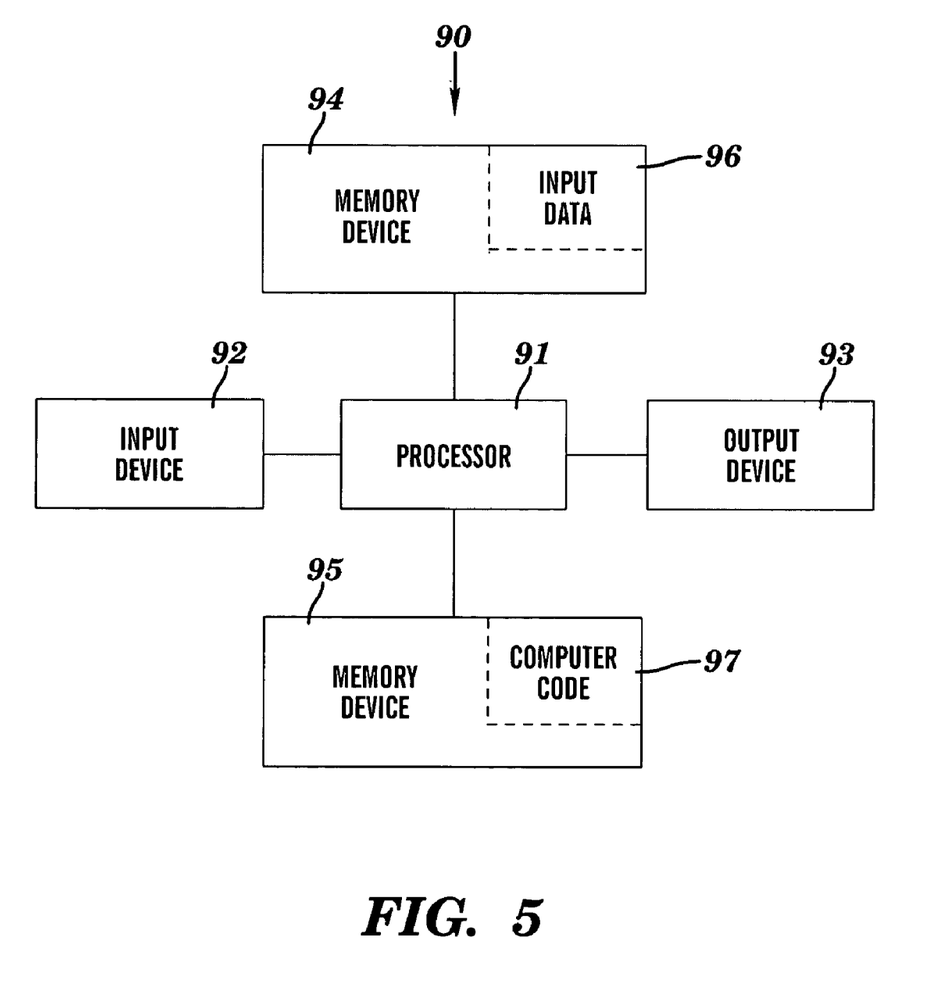
FIG. 5 illustrates a computer system associated with FIGS. 1-4, in accordance with embodiments of the present invention.

FIG. 5 illustrates a computer system 90 associated FIGS. 1-4, in accordance with embodiments of the present invention. The computer system 90 comprises a processor 91, an input device 92 coupled to the processor 91, an output device 93 coupled to the processor 91, and memory devices 94 and 95 each coupled to the processor 91. The input device 92 may be, inter alia, a keyboard, a mouse, etc. The output device 93 may be, inter alia, a printer, a plotter, a computer screen, a magnetic tape, a removable hard disk, a floppy disk, etc. The memory devices 94 and 95 may be, inter alia, a hard disk, a floppy disk, a magnetic tape, an optical storage such as a compact disc (CD) or a digital video disc (DVD), a dynamic random access memory (DRAM), a read-only memory (ROM), etc. The memory device 95 includes a computer code 97. The computer code 97 includes an algorithm that implements the logic of FIG. 2 and/or FIG. 4. Thus, the computer code 97 may represent at least one server of: the proxy server 14, the application server 12, the database server 16, or any of the database servers 46, 56, and 66 of FIG. 2 and/or FIG. 4. The proxy server 14, the application server 12, the database server 16, or any of the database servers 46, 56, and 66 of FIG. 2 and/or FIG. 4 may all reside within the same computer system 90, or alternatively may be distributed within a plurality of computer systems analogous to the computer system 90.

In FIG. 5, the processor 91 executes the computer code 97. The memory device 94 includes input data 96. The input data 96 includes input required by the computer code 97. The output device 93 displays output from the computer code 97. Either or both memory devices 94 and 95 (or one or more additional memory devices not shown in FIG. 5) may be used as a computer usable medium (or a computer readable medium or a program storage device) having a computer readable program code embodied therein and/or having other data stored therein, wherein the computer readable program code comprises the computer code 97. Generally, a computer program product (or, alternatively, an article of manufacture) of the computer system 90 may comprise said computer usable medium (or said program storage device).

While FIG. 5 shows the computer system 90 as a particular configuration of hardware and software, any configuration of hardware and software, as would be known to a person of ordinary skill in the art, may be utilized for the purposes stated supra in conjunction with the particular computer system 90 of FIG. 5. For example, the memory devices 94 and 95 may be portions of a single memory device rather than separate memory devices.

While embodiments of the present invention have been described herein for purposes of illustration, many modifications and changes will become apparent to those skilled in the art. Accordingly, the appended claims are intended to encompass all such modifications and changes as fall within the true spirit and scope of this invention.

What is claimed is:

1. A method for processing a database query by a proxy server, said proxy server stored on a computer readable medium and executed by a processor of a computer system, said method comprising:

receiving the query from an application server, wherein the application server is coupled to a computer-readable memory device;

determining whether any database table specified in the query comprises a data isolation field pertaining to a group, wherein a value of the data isolation field identifies a subgroup of the group;

if said determining determines that no table specified in the query comprises the data isolation field then performing database server steps of forwarding the query to a database server which is coupled to a database comprising tables having the data isolation field, receiving a response to the query from the database server, and forwarding the response to the application server and into storage within the computer-readable memory device, but if said determining determines that at least one table specified in the query comprises the data isolation field then ascertaining whether the query includes a Where-type clause comprising the data isolation field:

if said ascertaining ascertains that the query includes a Where-Type clause comprising the data isolation field then performing the database server steps, but if said ascertaining ascertains that the query does not include a Where-Type clause comprising the data isolation field then performing error steps comprising returning an error code and/or empty dataset to the application server and recording in the computer-readable memory device that a query error has occurred, wherein the receiving step, the determining step, the ascertaining step the database server steps, and the error steps are performed by the proxy server, wherein the database is a relational database, wherein a first database table specified in the query is a secondary table comprising a foreign key that links to a primary table in the database, wherein the primary table has a column consisting of the data isolation field, wherein the secondary table does not have a column consisting of the data isolation field, and wherein the secondary table comprises the data isolation field through its linkage to the primary table via the foreign key.

2. The method of claim 1, wherein a first database table specified in the query comprises records specific to a plurality of subgroups of the group.

3. The method of claim 1, wherein the database further comprises a common database of tables comprising data that is not specific to any subgroup of the group.

4. The method of claim 1, wherein the query is a Structured Query Language (SQL) query, and wherein the Where-Type clause is a WHERE clause.

5. The method of claim 1, wherein the group is an organization, and wherein the subgroups are departments of the organization.

6. A method for processing a database query by a proxy server, said proxy server stored on a computer readable medium and executed by a processor of a computer system, said method comprising:

receiving the query from an application server, wherein the application server is coupled to a computer-readable memory device, wherein the query is a request for data stored within N databases, wherein N is at least 2, wherein the N databases comprise database tables that include a data isolation field pertaining to a group comprising a plurality of subgroups, wherein a value of the data isolation field identifies a subgroup of the group, wherein at least one database of the N databases includes a common database of tables comprising data that is not specific to any subgroup of the group, wherein the proxy server is adapted to communicate with N database servers, and wherein the N database servers are respectively coupled to the N databases;

making a determination of whether any database table specified in the query comprises a data isolation field pertaining to a group, wherein a value of the data isolation field identifies a subgroup of the group;

if said making a determination makes a determination that no table specified in the query comprises the data isolation field then performing database common steps of forwarding the query to a common database server of the N database servers which can access the common database, receiving a response to the query from the common database server, and forwarding the response from the common database server to the application server and into storage within the computer-readable memory device, but if said making a determination makes a determination that at least one table specified in the query comprises the data isolation field then determining whether the query includes a Where-type clause comprising the data isolation field;

if said determining determines that the query does not include a Where-type clause comprising the data isolation field then performing error steps comprising returning an error code and/or empty dataset to the application server and recording in the computer-readable memory device that a query error has occurred, but if said determining determines that the query includes a Where-type clause comprising the data isolation field then ascertaining whether the value of the data isolation field in the query is valid for a specific server of the N database servers;

if said ascertaining ascertains that the value of the data isolation field in the query is valid for a specific database server of the N database servers then performing database server steps of forwarding the query to the specific database server, receiving a response to the query from the specific database server, and forwarding the response from the specific database server to the application server and into storage within the computer-readable memory device, but if said ascertaining ascertains that the value of the data isolation field in the query is not valid for a specific database server of the N database servers then performing said error steps, wherein the receiving step, the determining step, the ascertaining step, the database common steps, the database server steps, and the error steps are performed by the proxy server.

7. The method of claim 6, wherein said making a determination makes a determination that no table specified in the query comprises the data isolation field.

8. The method of claim 6, wherein the at least one database of the N databases consists of the N databases.

9. The method of claim 6, wherein each database of the N databases includes a table that is specific to one subgroup of the group and does not include a table that is specific to any other subgroup of the group, and wherein no two databases of the N databases include a table that is specific to a same subgroup of the group.

10. The method of claim 6, wherein one or more databases of the N databases includes a table that is specific to at least two subgroups of the group.

11. The method of claim 6, wherein said making a determination makes a determination that at least one table specified in the query comprises the data isolation field, and wherein said determining determines that the query does not include a Where-type clause comprising the data isolation field.

12. The method of claim 11, wherein the N databases are relational databases, wherein a secondary table in the database that is coupled to the specific database server is specified in the query and comprises a foreign key that links to a primary table in the database that is coupled to the specific database server, wherein the primary table has a column consisting of the data isolation field, wherein the secondary table does not have a column consisting of the data isolation field, and wherein the secondary table comprises the data isolation field through its linkage to the primary table via the foreign key.

13. The method of claim 11, wherein the N databases are relational databases, wherein the query is a Structured Query Language (SQL) query, and wherein the Where-Type clause is a WHERE clause.

14. The method of claim 6, wherein said making a determination makes a determination that at least one table specified in the query comprises the data isolation field, wherein said determining determines that the query includes a Where-type clause comprising the data isolation field, and wherein said ascertaining ascertains that the value of the data isolation field in the query is valid for a specific database server of the N database servers.

15. The method of claim 6, wherein said making a determination makes a determination that at least one table specified in the query comprises the data isolation field, wherein said determining determines that the query includes a Where-type clause comprising the data isolation field, and wherein said ascertaining ascertains that the value of the data isolation field in the query is not valid for a specific database server of the N database servers.

16. A system for processing a database query, said system comprising a proxy server and a database server, said proxy server stored on a computer readable medium and executed by a processor of a computer system, said database server coupled to a database having database tables comprising a data isolation field pertaining to a group such that a value of the data isolation field identifies a subgroup of the group, said proxy server adapted to receive the query from an application server, wherein the application server is coupled to a computer-readable memory device;

said proxy server adapted to determine whether any database table specified in the query comprises the data isolation field;

if the proxy server has determined that no table specified in the query comprises the data isolation field then the proxy server is adapted to perform database server steps of forwarding the query to the database server, receiving a response to the query from the database server, and forwarding the response to the application server and into storage within the computer-readable memory device, but if the proxy server has determined that at least one table specified in the query comprises the data isolation field then the proxy server is adapted to ascertain whether the query includes a Where-type clause comprising the data isolation field;

if the proxy server has ascertained that the query includes a Where-Type clause comprising the data isolation field then the proxy server is adapted to perform the database server steps, but if the proxy server has ascertained that the query does not include a Where-Type clause comprising the data isolation field then the proxy server is adapted to perform error steps comprising returning an error code and/or empty dataset to the application server and recording in the computer-readable memory device that a query error has occurred,
wherein the database is a relational database,
wherein a first database table specified in the query is a secondary table comprising a foreign key that links to a primary table in the database, wherein the primary table has a column consisting of the data isolation field, wherein the secondary table does not have a column consisting of the data isolation field, and wherein the secondary table comprises the data isolation field through its linkage to the primary table via the foreign key.

17. The system of claim 16, wherein a first database table specified in the query comprises records specific to a plurality of subgroups of the group.

18. The system of claim 16, wherein the database further comprises a common database of tables comprising data that is not specific to any subgroup of the group.

19. The system of claim 16, wherein the query is a Structured Query Language (SQL) query, and wherein the Where-Type clause is a WHERE clause.

20. The system of claim 16, wherein the group is an organization, and wherein the subgroups are departments of the organization.

21. A system for processing a database query, said system comprising a proxy server and N database servers respectively coupled to the N databases,
N being at least 2;
said proxy server stored on a computer readable medium and executed by a processor of a computer system;
said proxy server adapted to communicate with the N database servers;
said proxy server adapted to receive the query from an application server, wherein the application server is coupled to a computer-readable memory device, wherein the query is a request for data stored within the N databases, wherein the N databases comprise database tables that include a data isolation field pertaining to a group comprising a plurality of subgroups, wherein a value of the data isolation field identifies a subgroup of the group, and wherein at least one database of the N databases includes a common database of tables comprising data that is not specific to any subgroup of the group;
said proxy server adapted to make a determination of whether any database table specified in the query comprises a data isolation field pertaining to a group, wherein a value of the data isolation field identifies a subgroup of the group;
if said proxy server has made a determination that no table specified in the query comprises the data isolation field then the proxy server is adapted to perform database common steps of forwarding the query to a common database server of the N database servers which can access the common database, receiving a response to the query from the common database server, and forwarding the response from the common database server to the application server and into storage within the computer-readable memory device, but if said proxy server has made a determination that at least one table specified in the query comprises the data isolation field then the proxy server is adapted to determine whether the query includes a Where-type clause comprising the data isolation field;
if said proxy server has determined that the query does not include a Where-type clause comprising the data isolation field then the proxy server is adapted to perform error steps comprising returning an error code and/or empty dataset to the application server and recording in the computer-readable memory device that a query error has occurred, but if said proxy server has determined that the query includes a Where-type clause comprising the data isolation field then the proxy server is adapted to ascertain whether the value of the data isolation field in the query is valid for a specific database server of the N database servers;
if the proxy server has ascertained that the value of the data isolation field in the query is valid for a specific database server of the N database servers then the proxy server is adapted to perform steps of forwarding the query to the specific database server, receiving a response to the query from the specific database server, and forwarding the response from the specific database server to the application server and into storage within the computer-readable memory device, but if the proxy server has ascertained that the value of the data isolation field in the query is not valid for a specific database server of the N database servers then the proxy server is adapted to perform said error steps.

22. The system of claim 21, wherein said proxy server has made a determination that no table specified in the query comprises the data isolation field.

23. The system of claim 21, wherein the at least one database of the N databases consists of the N databases.

24. The system of claim 21, wherein each database of the N databases includes a table that is specific to one subgroup of the group and does not include a table that is specific to any other subgroup of the group, and wherein no two databases of the N databases include a table that is specific to a same subgroup of the group.

25. The system of claim 21, wherein one or more databases of the N databases includes a table that is specific to at least two subgroups of the group.

26. The system of claim 21, wherein said proxy server has made a determination that at least one table specified in the query comprises the data isolation field, and wherein said proxy server has determined that the query does not include a Where-type clause comprising the data isolation field.

27. The system of claim 26, wherein the N databases are relational databases, wherein a secondary table in the database that is coupled to the specific database server is specified in the query and comprises a foreign key that links to a primary table in the database that is coupled to the specific database server, wherein the primary table has a column consisting of the data isolation field, wherein the secondary table does not have a column consisting of the data isolation field, and wherein the secondary table comprises the data isolation field through its linkage to the primary table via the foreign key.

28. The system of claim 26, wherein the N databases are relational databases, wherein the query is a Structured Query Language (SQL) query, and wherein the Where-Type clause is a WHERE clause.

29. The system of claim 21, wherein said proxy server has made a determination that at least one table specified in the query comprises the data isolation field, wherein said proxy server has determined that the query includes a Where-type clause comprising the data isolation field, and wherein the proxy server has ascertained that the value of the data isolation field in the query is valid for a specific database server of the N database servers.

30. The system of claim 21, wherein said proxy server has made a determination that at least one table specified in the query comprises the data isolation field, wherein said proxy server has determined that the query includes a Where-type clause comprising the data isolation field, and wherein the proxy server has ascertained that the value of the data isolation field in the query is not valid for a specific database server of the N database servers.

31. A computer program product, comprising a computer usable medium having a computer readable program code embodied therein, said computer readable program code comprising a proxy server adapted to implement a method for processing a database query by the proxy server, said proxy server stored on a computer readable medium and executed by a processor of a computer system, said method comprising:

receiving the query from an application server, wherein the application server is coupled to a computer-readable memory device;

determining whether any database table specified the query comprises a data isolation field pertaining to a group, wherein a value of the data isolation field identifies a subgroup of the group;

if said determining determines that no table specified in the query comprises the data isolation field then performing database server steps of forwarding the query to a database server which is coupled to a database comprising tables having the data isolation field, receiving a response to the query from the database server, and forwarding the response to the application server and into storage within the computer-readable memory device, but if said determining determines that at least one table specified in the query comprises the data isolation field then ascertaining whether the query includes a Where-type clause comprising the data isolation field;

if said ascertaining ascertains that the query includes a Where-Type clause comprising the data isolation field then performing the database server steps, but if said ascertaining ascertains that the query does not include a Where-Type clause comprising the data isolation field then performing error steps comprising returning an error code and/or empty dataset to the application server and recording in the computer-readable memory device that a query error has occurred, wherein the receiving step, the determining step, the ascertaining step, the database server steps, and the error steps are performed by the proxy server, wherein the database is a relational database, wherein a first database table specified in the query is a secondary table comprising a foreign key that links to a primary table in the database, wherein the primary table has a column consisting of the data isolation field, wherein the secondary table does not have a column consisting of the data isolation field, and wherein the secondary table comprises the data isolation field through its linkage to the primary table via the foreign key.

32. The computer program product of claim 31, wherein a first database table specified in the query comprises records specific to a plurality of subgroups of the group.

33. The computer program product of claim 31, wherein the database further comprises a common database of tables comprising data that is not specific to any subgroup of the group.

34. The computer program product of claim 31, wherein the query is a Structured Query Language (SQL) query, and wherein the Where-Type clause is a WHERE clause.

35. The computer program product of claim 31, wherein the group is an organization, and wherein the subgroups are departments of the organization.

36. A computer program product, comprising a computer usable medium having a computer readable program code embodied therein, said computer readable program code comprising a proxy server adapted to implement a method for processing a database query by the proxy server, said proxy server stored on a computer readable medium and executed by a processor of a computer system, said method comprising:

receiving the query from an application server, wherein the application server is coupled to a computer-readable memory device, wherein the query is a request for data stored within N databases, wherein N is at least 2, wherein the N databases comprise database tables that include a data isolation field pertaining to a group comprising a plurality of subgroups, wherein a value of the data isolation field identifies a subgroup of the group, wherein at least one database of the N databases includes a common database of tables comprising data that is not specific to any subgroup of the group, wherein the proxy server is adapted to communicate with N database servers, and wherein the N database servers are respectively coupled to the N databases;

making a determination of whether any database table specified in the query comprises a data isolation field pertaining to a group, wherein a value of the data isolation field identifies a subgroup of the group;

if said making a determination makes a determination that no table specified in the query comprises the data isolation field then performing database common steps of forwarding the query to a common database server of the N database servers which can access the common database, receiving a response to the query from the common database server, and forwarding the response from the common database server to the application server and into storage within the computer-readable memory device, but if said making a determination makes a determination that at least one table specified in the query comprises the data isolation field then determining whether the query includes a Where-type clause comprising the data isolation field;

if said determining determines that the query does not include a Where-type clause comprising the data isolation field then performing error steps comprising returning an error code and/or empty dataset to the application server and recording in the computer-readable memory device that a query error has occurred, but if said determining determines that the query includes a Where-type clause comprising the data isolation field then ascertaining whether the value of the data isolation field in the query is valid for a specific server of the N database servers;

if said ascertaining ascertains that the value of the data isolation field in the query is valid for a specific database server of the N database servers then performing database server steps of forwarding the query to the specific database server, receiving a response to the query from the specific database server, and forwarding the response from the specific database server to the application server and into storage within the computer-readable memory device, but if said ascertaining ascertains that the value of the data isolation field in the query is not valid for a specific database server of the N database servers then performing said error steps, wherein the receiving step, the determining step, the ascertaining step, the database common steps, the database server steps, and the error steps are performed by the proxy server.

37. The computer program product of claim 36, wherein said making a determination makes a determination that no table specified in the query comprises the data isolation field.

38. The computer program product of claim 36, wherein the at least one database of the N databases consists of the N databases.

39. The computer program product of claim 36, wherein each database of the N databases includes a table that is specific to one subgroup of the group and does not include a table that is specific to any other subgroup of the group, and wherein no two databases of the N databases include a table that is specific to a same subgroup of the group.

40. The computer program product of claim 36, wherein one or more databases of the N databases includes a table that is specific to at least two subgroups of the group.

41. The computer program product of claim 36, said making a determination makes a determination that at least one table specified in the query comprises the data isolation field, and wherein said determining determines that the query does not include a Where-type clause comprising the data isolation field.

42. The computer program product of claim 41, wherein the N databases are relational databases, wherein a secondary table in the database that is coupled to the specific database server is specified in the query and comprises a foreign key that links to a primary table in the database that is coupled to the specific database server, wherein the primary table has a column consisting of the data isolation field, wherein the secondary table does not have a column consisting of the data isolation field, and wherein the secondary table comprises the data isolation field through its linkage to the primary table via the foreign key.

43. The computer program product of claim 41, wherein the N databases are relational databases, wherein the query is a Structured Query Language (SQL) query, and wherein the Where-Type clause is a WHERE clause.

44. The computer program product of claim 36, wherein said making a determination makes a determination that at least one table specified in the query comprises the data isolation field, wherein said determining determines that the query includes a Where-type clause comprising the data isolation field, and wherein said ascertaining ascertains that the value of the data isolation field in the query is valid for a specific database server of the N database servers.

45. The computer program product of claim 36, wherein said making a determination makes a determination that at least one table specified in the query comprises the data isolation field, wherein said determining determines that the query includes a Where-type clause comprising the data isolation field, and wherein said ascertaining ascertains that the value of the data isolation field in the query is not valid for a specific database server of the N database servers.

* * * * *